United States Patent [19]
Glynn

[11] Patent Number: 5,618,100
[45] Date of Patent: Apr. 8, 1997

[54] SOLAR POWERED FLAT LAMP NIGHT LIGHT

[75] Inventor: Kenneth P. Glynn, Raritan Township, Hunterdon County, N.J.

[73] Assignee: Ideal Ideas, Inc., Flemington, N.J.

[21] Appl. No.: 607,998

[22] Filed: Mar. 4, 1996

[51] Int. Cl.⁶ ........................................ F21L 11/00
[52] U.S. Cl. ........................... 362/183; 362/84; 362/276; 362/812; 136/291
[58] Field of Search ........................... 362/84, 145, 183, 362/276, 397, 802, 812, 226; 136/291

[56] References Cited

U.S. PATENT DOCUMENTS

| | | |
|---|---|---|
| 4,319,310 | 3/1982 | Kingsley .................................. 136/291 |
| 4,841,416 | 6/1989 | Doss ....................................... 362/276 |
| 4,945,281 | 7/1990 | Ipson . |
| 5,064,276 | 11/1991 | Endo et al. . |
| 5,153,386 | 10/1992 | Siefer et al. . |
| 5,253,150 | 10/1993 | Vanni ..................................... 362/183 |
| 5,266,865 | 11/1993 | Haizumi et al. . |
| 5,272,410 | 12/1993 | Fox . |
| 5,276,382 | 1/1994 | Stocker et al. . |
| 5,294,368 | 3/1994 | Karam et al. . |
| 5,305,190 | 4/1994 | Clement . |
| 5,309,071 | 5/1994 | Karam et al. . |
| 5,313,141 | 5/1994 | Kimball . |

*Primary Examiner*—Y. My Quach
*Attorney, Agent, or Firm*—Kenneth P. Glynn, Esq.

[57] ABSTRACT

The present invention is a solar powered flat, electroluminescent lamp night light adapted to be placed upon or attached to a window sill. The night light has a vertical upper portion which retains a solar cell unit that faces toward the window when the night light is placed on the window sill. The night light also has a horizontal middle section which is either adapted to rest upon a window sill, thereby balancing the night light in place, or adapted to attach the night light directly to the a portion of the window sill. The night light also a vertical lower portion which houses a flat, electroluminescent sheet light source. When the night light is placed upon a window sill, the flat, electroluminescent sheet light source faces into the room and illuminates the area of interest. The solar cell unit is configured to receive sunlight and convey electrical current to the flat, electroluminescent sheet light source and to an energy retaining device. The device could also have a set of sensors which determines if the night light should be on or off. A switch could also be provided for manual operation.

20 Claims, 4 Drawing Sheets

5,618,100

SOLAR POWERED FLAT LAMP NIGHT LIGHT

BACKGROUND OF THE INVENTION

1. Field of the Invention

The present invention relates to luminescent night lights, and more particularly to solar powered flat, electroluminescent sheet light night lights.

2. Information Disclosure Statement

Night lights have existed for many years. Typically, night lights are plugged into an outlet in the wall. They can be turned on via switch or triggered by a sensor detecting a lack of light. The present invention uses a solar powered flat lamp night light.

The following is representative of prior art involving flat light sources:

U.S. Pat. No. 5,272,410 deals with a light emitting panel and display assembly including such panel whereby even illumination is provided over the entire display assembly. U.S. Pat. No. 4,945,281 was concerned with overcoming the problems of high over-voltage to initiate discharge and the time taken to initiate discharge (the strike time) requirements for illuminating flat light sources. U.S. Pat. No. 5,064,276 was concerned with producing uniform illuminance over a planar area such as a liquid crystal display where the light sources are at the ends. U.S. Pat. No. 5,266,865 relates to an electroluminescent lamp of a three electrode structure which can be effectively used for example, as a back light for a liquid crystal display.

U.S. Pat. No. 5,153,386 was concerned with improving the illumination of the working surface of a digitizer tablet, by a light source which included an optical structure located over the grid of the position determining structure of the digitizer to provide a surface-lit table, or beneath the grid to provide a back-lit table. This prior art sought to eliminate undesirable lighting effects on the working surface such as patterns, lines or spots emanating from the structure itself caused by the fabrication or manufacturing process.

U.S. Pat. No. 5,276,382 dealt with improving the lead attachment for electroluminescent lamps so that the leads are mechanically more stable. U.S. Pat. Nos. 5,294,368 and 5,309,071 issued to Karem et al regarded methods for making electroluminescent phosphors with which electroluminescent lamps are comprised.

U.S. Pat. No. 5,313,141 concerned an inverter for powering an electroluminescent lamp with a direct current supply.

U.S. Pat. No. 5,303,190 related to placing electroluminescent strips on standard windshield wiper arms to improve visibility of the vehicle thereby providing safety.

In summary, the above cited flat light prior art concerned devices or methods for; improving illuminance over planar areas such as digitizer tablets and liquid crystal displays, improving the lead attachment for electroluminescent lamps, making electroluminescent phosphors with which electroluminescent lamps are comprised, creating an inverter for powering electroluminescent lamps with a direct current power supply, and applying electroluminescent strips to standard windshield wipers. In contrast, with the present invention, a solar powered flat, sheet light source is used for a night light.

Notwithstanding the prior art in this field, it is believed that the present invention which teaches the use of a solar powered flat lamp night light is neither taught nor rendered obvious.

SUMMARY OF THE INVENTION

The present invention is a solar powered flat, electroluminescent night light adapted to be placed upon or attached to a window sill. The night light has a vertical upper portion which retains a solar cell unit that faces toward the window when the night light is placed upon a window sill. The night light also has a horizontal middle portion. This portion may be adapted to rest upon a window sill or adapted to attach the night light directly to a portion of the window sill. The night light also has a vertical lower portion which houses a flat, electroluminescent sheet light source. When the night light is placed upon the window sill, the flat, sheet light source faces into the room and provides a luminescent glow to the nearby area. The solar cell unit is configured so as to permit the solar cell unit to receive sun light and to convey electrical current to the flat, electroluminescent sheet light source. A preferred night light embodiment is fitted with an on/off switch and is fitted with an energy retaining element, e.g. fitted with rechargeable battery, thereby permitting the night light to convey illumination continuously, especially at night. A further embodiment of the invention uses a sensor which turns on the night light when there are no detectable sources of light present in the area.

BRIEF DESCRIPTION OF THE DRAWINGS

The present invention should be more fully understood when the specification herein is taken in conjunction with the drawings appended thereto, wherein.

DETAILED DESCRIPTION OF THE PRESENT INVENTION

The present invention is a solar powered flat, electroluminescent sheet night light device adapted to be placed upon or attached to a window sill. The night light has a vertical upper portion which retains a solar cell unit that faces toward the window when the night light is placed upon a window sill. The night light also has a horizontal middle section which is either adapted to rest upon a window sill or adapted to attach the night light directly to a portion of the window sill. The night light also has a vertical lower portion which houses a flat, electroluminescent sheet light source. When the night light is placed upon the window sill, the flat electroluminescent sheet light source faces into the room and provides a luminescent glow to the area. The solar cell is configured so as to permit the solar cell unit to receive sun light and convey electrical current to the flat, electroluminescent sheet light source. An embodiment of the night light has an on/off switch and is adapted with a conventional energy retaining device (e.g. a rechargeable battery). A further embodiment has a sensor adapted to turn on the night light when there is no light in the area of interest.

What is generally meant by a "flat, electroluminescent sheet light source" is an electroluminescent lamp employing phosphors to produce illuminance. Notwithstanding, "flat, electroluminescent sheet light source" also includes other available light sources with appropriate flat shapes, dimensions, sizes, luminescence and power requirement traits.

The present invention night light may, for example, be fabricated out of plastic, vinyl, glass, metal or combinations thereof. The flat shape and thin dimension of the present invention night light allows the component to be used in areas with limited space and to be conveniently attached to or rested upon any size window sill, unlike other contemporary night lights which are more bulky and must be plugged into an electrical socket. It is to be understood that any variety of generally flat shapes and dimensions may be employed with reference to the present invention night light.

The present invention is detailed in FIGS. 1 through 8 with like elements or components being like numbered.

Figure 1:
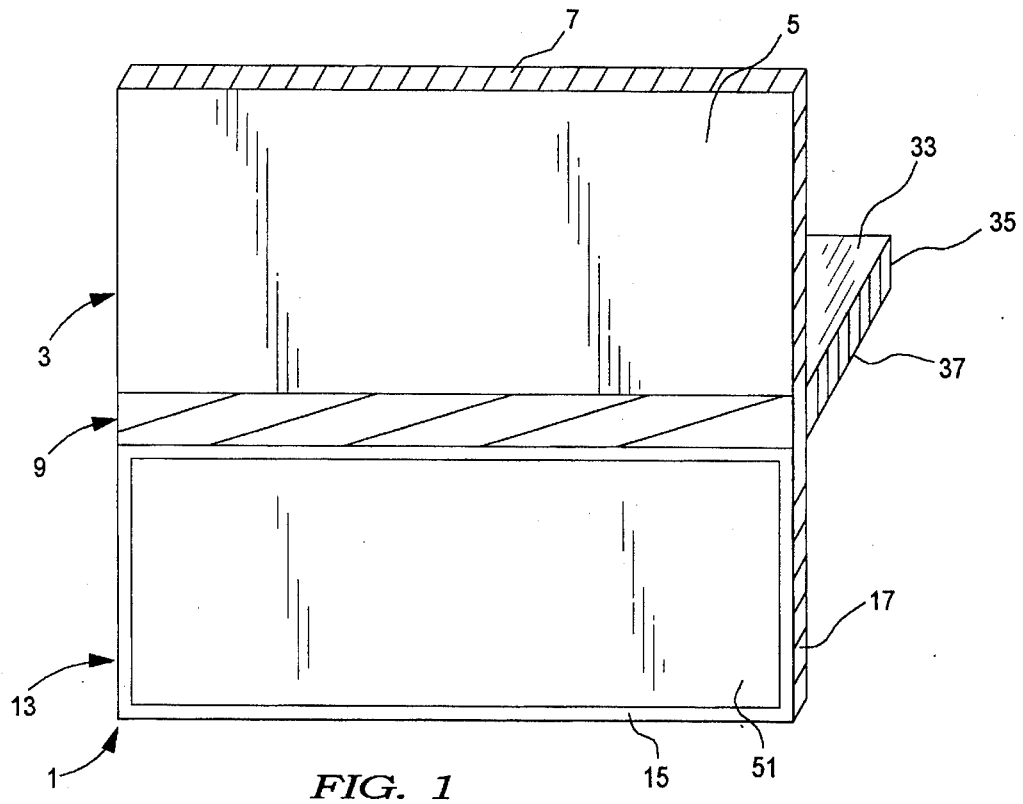
FIG. 1 shows a front view of a present invention solar powered flat, electroluminescent sheet night light.
Figure 2:
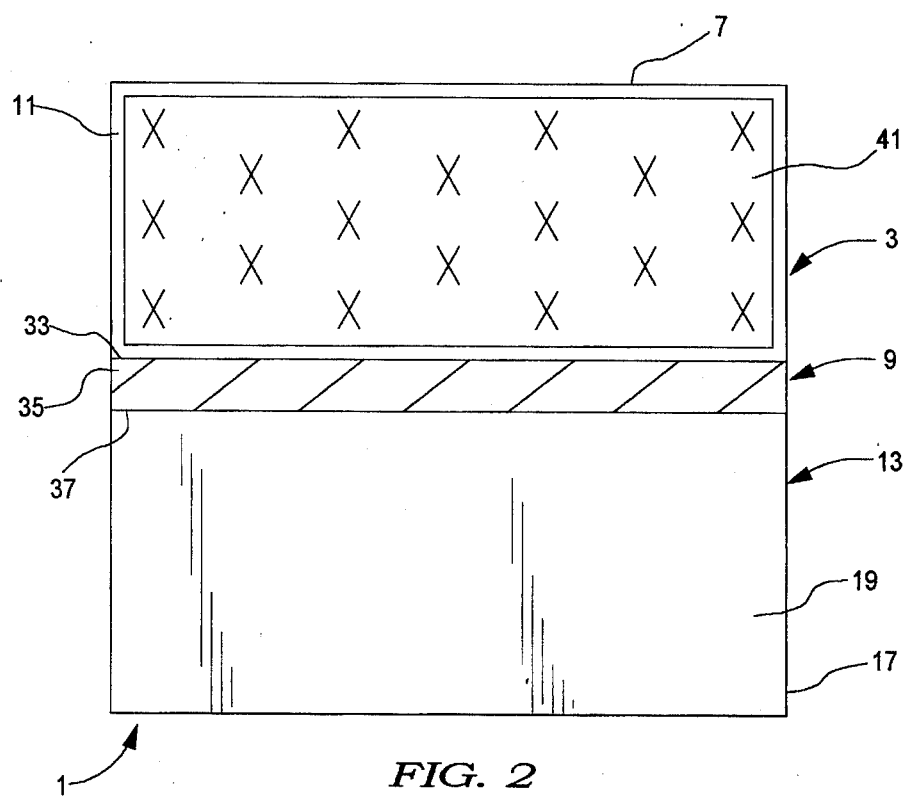
FIG. 2 shows a rear view of the present invention shown in FIG. 1.

Referring to FIGS. 1 and 2 there is shown a night light device of the present invention. A main body 1 has a vertical upper portion 3, a horizontal middle section 9 and a vertical lower portion 13. Vertical upper portion 3 has a room facing side 5, outer edge 7 and a light receiving side 11. Room facing side 5 is flat and faces into a room when the night light is placed upon a window sill. Light receiving side 11 is adapted to retain a solar cell unit 41 and will face the window when the night light is placed upon the window sill. Solar cell 41 may be any commercial variety solar cell unit which generates and supplies an alternating current or a direct current which is fed through any commercially available inverter, thus producing a high voltage, proper low frequency, alternating current, thereby adequately powering the present invention night light.

Horizontal middle section 9 extends outwardly toward a window when main body 1 is placed upon a window sill. Horizontal middle section 9 has an upper side 33, edge 35 and lower side 37. When main body 1 is placed on the window sill, lower side 37 rests upon the window sill and holds main body 1 in place. In this configuration, horizontal middle section 9 is constructed to function as a counterbalance and to fixedly hold the night light in place on the window sill. Vertical lower portion 13, has a light illuminating side 15, outer edge 17, and a wall facing side 19. Wall facing side 19 is flat and faces toward a portion of the wall underneath the window sill when the present invention night light is placed upon a window sill. Light illuminating side 15 is configured to retain and house a flat, electroluminescent sheet light source 51, which would be facing towards the area to be illuminated when the night light is situated on the window sill.

Operationally, solar cell unit 41 is electrically connected to flat, electroluminescent sheet light source 51 and an energy retaining device (not shown) via any conventional manner. Energy retaining device is also electrically connected to flat, electroluminescent sheet light source 51. When the night light is placed on the window sill, light receiving side 11 faces the window so that solar cell unit 41 receives solar energy. Solar cell unit 41 then converts it and supplies the electrical current to flat, electroluminescent sheet light source 51 and energy retaining device. The electrical current activates flat, electroluminescent sheet light source 51 and causes the area of interest to be illuminated. Electrical current is also provided to the energy retaining device 21, so that the night light can continue to illuminate the area when solar cell unit 41 is not receiving any solar energy.

Figure 3:
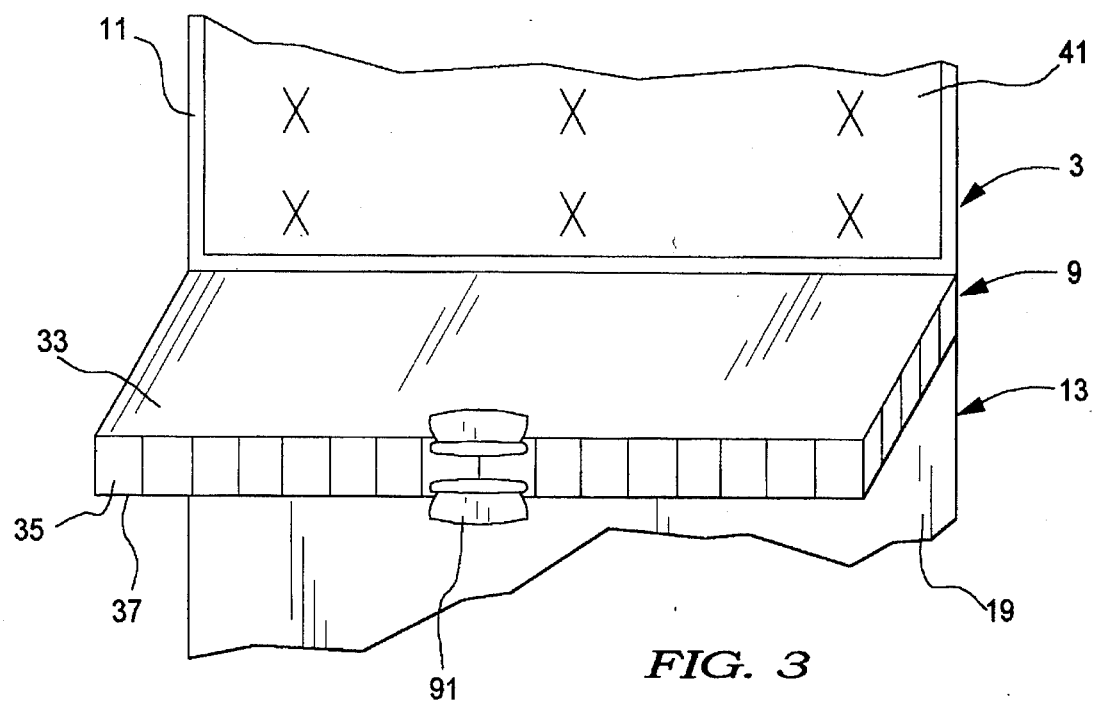
FIG. 3 shows a partial rear view with an alternate window sill attaching mechanism.

Referring now to FIG. 3, an alternative embodiment of the night light has an attachment to hold the night light onto the window sill. Identical parts are identically numbered. In this embodiment horizontal middle section 9 is equipped with a flexible gripping device 91. Flexible gripping device 91 functions by engaging and/or clipping onto a portion of a window sill, thereby locking the night light firmly in place. Thus, flexible gripping means 91 may allow horizontal middle section 9 to be shorter and thinner than the earlier embodiment which utilizes horizontal middle section 9 as a counterbalance.

Figure 4:
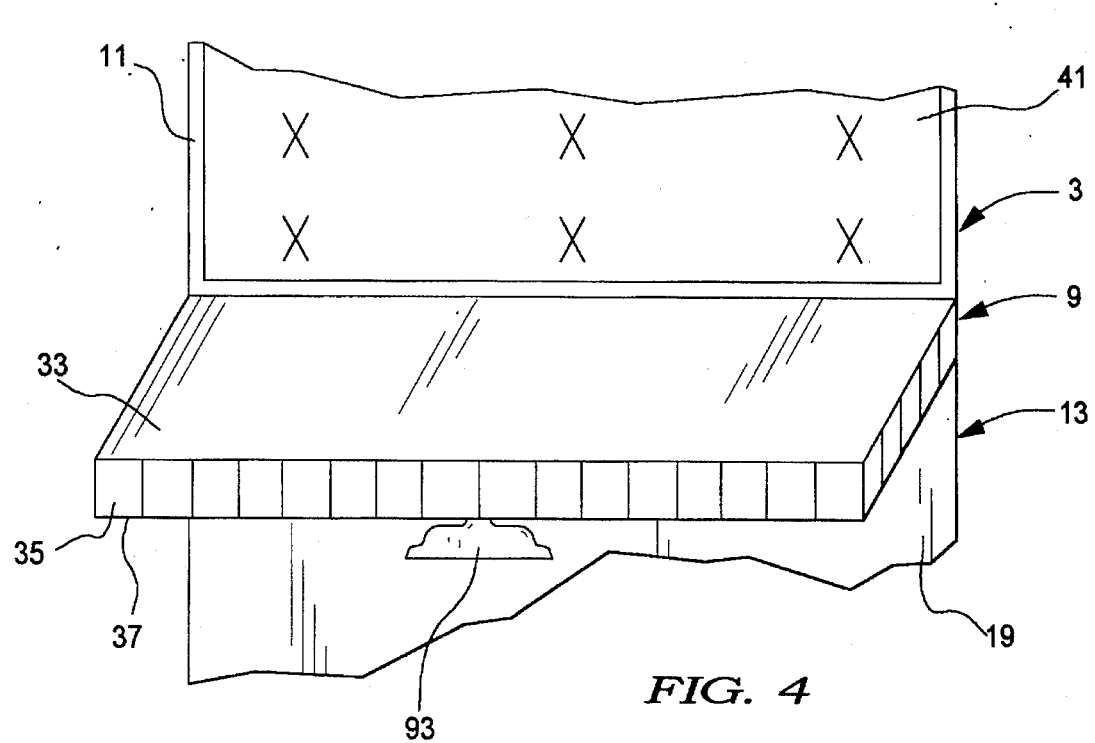
FIG. 4 shows a partial rear view with still another window sill attaching mechanism.

Referring now to FIG. 4, a further embodiment of the night light is shown with an alternative attachment device. In this embodiment, horizontal middle section 9 is fitted with an air-tight suction cup 93 which engages and adheres to a portion of a window sill, thereby holding the night light firmly in place. As a result, horizontal middle section 9 may again be shorter and thinner than the embodiment utilizing the counterbalance effect.

Figure 5:
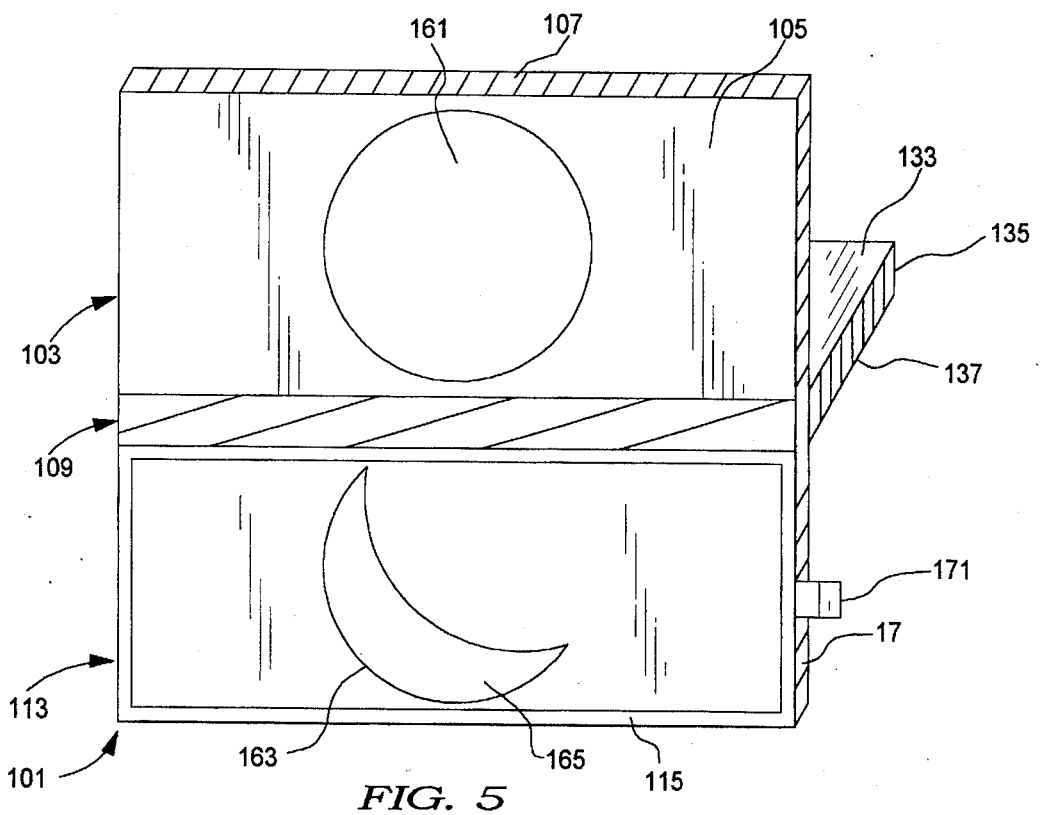
FIG. 5 shows design work on an alternate embodiment of the present invention.
Figure 6:
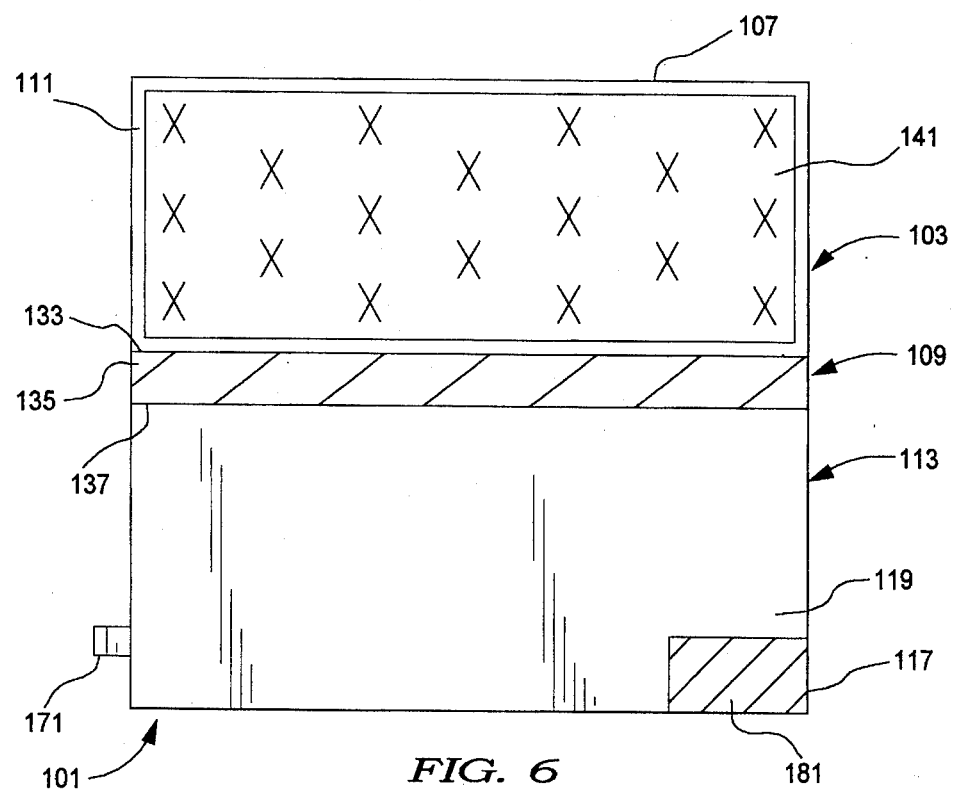
FIG. 6 shows a rear view of the embodiment of FIG. 5 with an on/off switch and a rechargeable battery.

Referring now to FIGS. 5 and 6, a further embodiment of the night light is shown. Similar to the above embodiments, a main body 101 comprises a vertical upper portion 103, a horizontal middle section 109 and a vertical lower portion 113. As before, vertical upper portion 103 has a light receiving side 111, an edge 107 and a room facing side 105. Light receiving side 111 is equipped to retain a solar cell unit 141 and will, of course, face the window when the night light is placed on the window sill. In this embodiment, room facing side 105 is embellished with a picture of the sun. However, room facing side 105 may be embellished with any other suitable symbolic embellishment, such as stars, galaxies, comets, planets and so on.

Horizontal middle section 109 has an upper side 133, edge 135, and lower side 137. When main body 101 is placed into position upon a window sill, lower side 137 rests upon the window sill, thereby holding the night light in place. As before, horizontal middle section 109 acts as a counterbalance and fixedly holds main body 101 in place. As explained above, horizontal middle section could also be equipped with attachment devices to keep the night light in place and reduce the size of the horizontal middle section 109.

Vertical lower portion 113, as before, has a light illuminating side 115, outer edge 117 and wall facing side 119. Light illuminating side 115 is constructed to retain and house a flat, electroluminescent sheet light source 165, which will obviously face into the room and illuminate the area of interest when the night light is properly situated onto the window sill. Unlike the previous embodiments, light receiving side 115 has an orifice 163 which is shaped like a crescent moon. Thus, when the night light is illuminating the room, orifice 163 produces a crescent moon shaped illumination. Alternatively, flat, electroluminescent sheet light source 165 may itself comprise the moon crescent shape or any other shape, thereby eliminating the need for orifice 163. Wall facing side 119, as before, faces the wall when the night light is properly placed. As a consequence, it may be a proper place for locating an energy retaining device.

In this embodiment, rechargeable battery 181 receives and stores electricity produced by solar cell unit 141. However, the energy retaining device may be any other commercially available devices which have the same properties. Note that rechargeable battery 181 may be located in any other suitable place, and FIG. 6 only shows an illustration of one of these places. Vertical lower portion 113 also has an on/off switch 171 which allows a user to activate the night light at his or her leisure. In this embodiment, when switch 171 is in an off position, rechargeable battery 181 can collect and store energy if the night light is properly placed and solar energy is available. This would allow an user to use the night light at night when there is no available solar energy. In this embodiment, when the night light is turned on, it would produce continuous illumination whether used during the day or night. Furthermore, the night light could be placed elsewhere if needed and will provide illumination until rechargeable battery 181 is spent. At which point, rechargeable battery 181 would have to be recharged.

Rechargeable battery 181 is electrically connected to solar cell unit 141 housed in light receiving side 111 and to flat, electroluminescent sheet light source 165 via on/off switch 171. When the night light is properly placed upon the window sill, solar cell unit 141 will convert and produce electrical current which will be stored in rechargeable battery 181. This will occur irregardless of whether switch 171 is in an on or off position. When switch 171 is in an on position, rechargeable battery 181 will supply electrical current to flat, electroluminescent sheet light source 165, which will in turn illuminate the area of interest.

Figure 7:
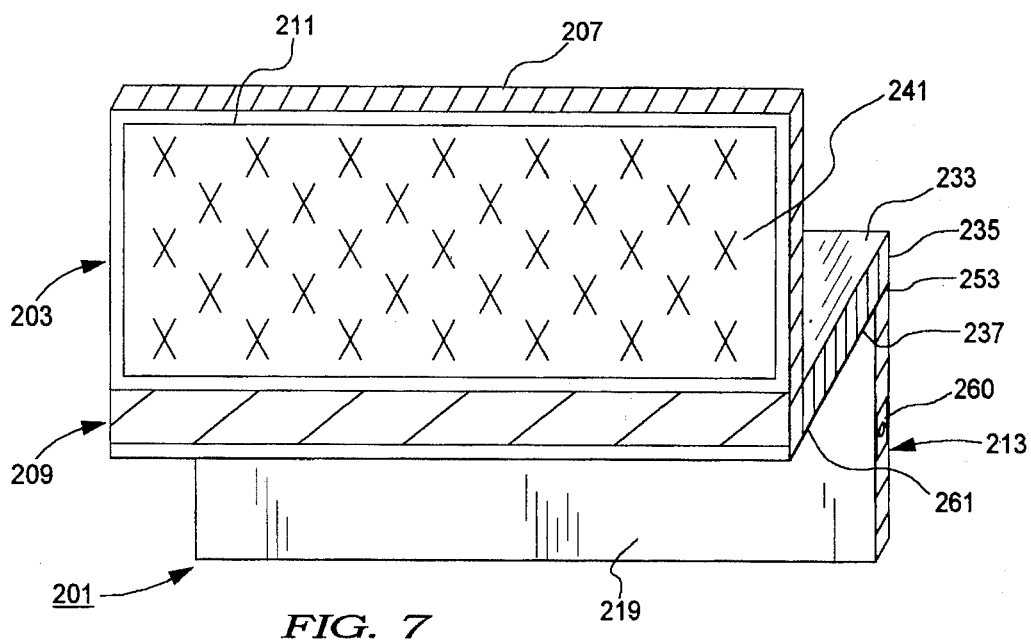
FIG. 7 shows a rear view of an alternate configuration of the present invention.
Figure 8:
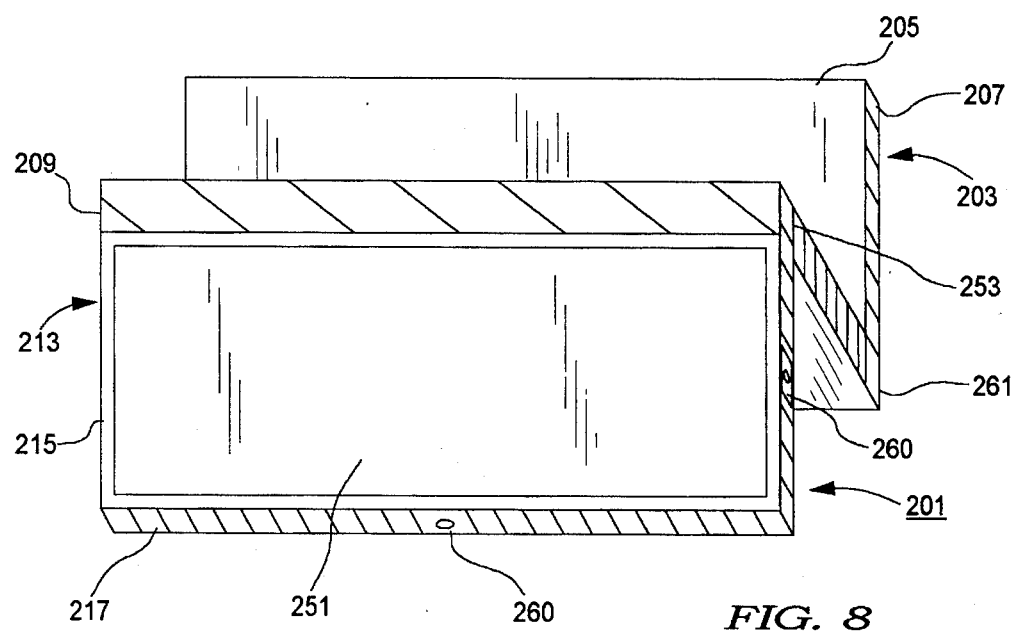
FIG. 8 shows the front view of the embodiment shown in FIG. 7.

Referring now to FIG. 7, an alternate configuration is shown of the solar powered night light. A main body 201 has a vertical upper portion 203, a horizontal middle section 209 and a vertical lower portion 213. Vertical upper portion 203 has a room facing side 205, outer edge 207 and a light receiving side 211. Room facing side 205 is flat and faces into a room when the night light is placed upon a window sill. As before light receiving side 211 is adapted to retain a solar cell unit 241 and will face the window when the night light is placed upon the window sill.

Horizontal middle section 209 extends outwardly toward a window when main body 201 is placed upon a window sill. Horizontal middle section 209 has an upper side 233, edge 235 and lower side 237. When main body 201 is placed on the window sill, lower side 237 rests upon the window sill and holds main body 201 in place. In this configuration, horizontal middle section 209 is constructed to function as a counterbalance and to fixedly hold the night light in place on the window sill. Vertical lower portion 213, has a light illuminating side 215, outer edge 217, and a wall facing side 219. Wall facing side 219 is flat and faces toward a portion of the wall underneath the window sill when the present invention night light is placed upon a window sill. Light illuminating side 215 is configured to retain and house a flat, electroluminescent sheet light source 251, which would be facing towards the area to be illuminated when the night light is situated on the window sill. Unlike the other embodiments, vertical upper portion 203 and vertical lower portion 213 are positioned on opposite ends of horizontal middle section 209. Vertical upper portion 203 is positioned on upper side 233 on a window end 261 of horizontal middle section 209 such that the light receiving side 211 can be placed in near proximity and in parallel with a window. Vertical lower portion 213 is positioned on lower surface 237 on a room end 253 such that light illuminating side 215 faces into the area of interest. This configuration has the added advantage of stabilizing the night light as it sits on the window sill.

In this embodiment, rechargeable battery (not shown) receives and stores electricity produced by solar cell unit 241. However, the energy retaining device may be any other commercially available devices which have the same properties. Note that rechargeable battery may be located in any suitable place on main body 201. Main body 201 also has a set of sensors which determines the on/off state of the night light. The sensors can be any of a variety of commercially available types which can either 1) activate (on state) the night light when there is a lack of light or 2) activate (on state) in the presence of motion in the area of interest. The lack of light sensor can either detect the lack of light or the presence of light in the area of interest and can activate/deactivate the night light as appropriate. In this embodiment, when sensor 260 determines an off state, rechargeable battery can collect and store energy if the night light is properly placed and solar energy is available. This would allow a user to use the night light at night when there is no available solar energy. In this embodiment, when the sensor 260 determines that the night light should be activated, it would produce continuous illumination whether used during the day or night. Furthermore, the night light could be placed elsewhere if needed and will provide illumination until rechargeable battery is spent. At which point, rechargeable battery would have to be recharged.

Operationally, solar cell unit 241 is electrically connected to rechargeable battery. It could also be electrically connected to flat, electroluminescent sheet light source 265 via sensors 260. Rechargeable battery is also electrically connected to flat, electroluminescent sheet light source 265 via sensors 260. When the night light is properly placed upon the window sill, solar cell unit 241 will convert and produce electrical current which will be stored in rechargeable battery. This will occur irregardless of whether sensor 260 is in an on or off state. When sensor 260 is in an on state and there is no source of solar energy, rechargeable battery will supply electrical current to flat, electroluminescent sheet light source 265, which will in turn illuminate the area of interest. As a further feature a switch (not shown) could be electrically connected to the sensors 260 so that a user could manually turn on or off the night light if so desired.

Obviously, numerous modifications and variations of the present invention are possible in light of the above teachings. It is therefore understood that within the scope of the appended claims, the invention may be practiced otherwise than as specifically described herein.

What is claimed is:

1. A solar cell powered flat night light which comprises:

a) a main body having a vertical upper portion connected to, a middle horizontal section and a vertical lower portion;

b) said vertical upper portion having a light receiving side, said light receiving side having a means for housing and retaining a solar cell such that solar energy may be received and an electrical current generated thereby;

c) said horizontal middle section having an upper surface, an edge and a lower surface and having a means for maintaining a placement of the solar cell powered flat night light on a support;

d) said vertical lower portion having a light illuminating side, said light illuminating side having a means for housing and retaining a flat, electroluminescent sheet light source illuminating an area when said electrical current is supplied to the electroluminescent sheet light source;

e) means for placing said vertical upper portion on said upper surface such that said solar energy can be received and said vertical lower portion beneath said lower surface such that said area may be illuminated;

f) said main body having an energy retaining device receiving and storing said electrical current; and g) means for electrically connecting said solar cell to said energy retaining device and to said flat, electroluminescent sheet light source to supply said electrical current.

2. The device of claim 1 wherein said main body further includes a sensor device electrically connected to said solar cell, said energy retaining device and said flat, electroluminescent sheet light source, said sensor device having a means for determining an on state and an off state, wherein said on state supplies said electrical current to said flat, electroluminescent sheet light source and in said off state said electrical current is not supplied to said flat, electroluminescent sheet light source.

3. The device of claim 2, wherein said means for determining said on state and said off state is based on a presence of light in said area.

4. The device of claim 2, wherein said means for determining said on state and said off state is based on an absence of light in said area.

5. The device of claim 2, wherein said means for determining said on state and said off state is based on a presence of motion in said area.

6. The device of claim 2 wherein said means for maintaining a placement configured for said horizontal middle section to function as a counterbalance and to rest upon said support having a window sill.

7. The device of claim 2 wherein said means for maintaining a placement has a flexible gripping means for attaching the night light to said support having a window sill.

8. The device of claim 2 wherein said means for maintaining a placement has an air-tight suction cup attaching the night light to said support having a window sill.

9. The device of claim 2, wherein said means for placing locates said vertical upper portion on a first end of said horizontal middle section and said vertical lower portion on a remaining end of said horizontal middle section.

10. The device of claim 9, wherein said light illuminating side has an orifice configured to dispense illumination therethrough.

11. The device of claim 10, wherein said orifice has a crescent moon shape.

12. The device of claim 9, wherein said flat, electroluminescent sheet light source is configured in a crescent moon shape.

13. The device of claim 1 wherein said main body further includes a switch electrically connected to said solar cell, said energy retaining device and said flat, electroluminescent sheet light source, said switch supplying electrical current to said flat, electroluminescent sheet light source in an on position and not supplying said electrical current to said flat, electroluminescent sheet light source in an off position.

14. The device of claim 1, wherein said means for placing locates said vertical upper portion on a first end of said horizontal middle section and said vertical lower portion on a remaining end of said horizontal middle section.

15. The device of claim 14 wherein said main body further includes a switch electrically connected to said solar cell, said energy retaining device and said flat, electroluminescent sheet light source, said switch supplying electrical current to said flat, electroluminescent sheet light source in an on position and not supplying said electrical current to said flat, electroluminescent sheet light source in an off position.

16. The device of claim 14 wherein said main body further includes a sensor device electrically connected to said solar cell, said energy retaining device and said flat, electroluminescent sheet light source, said sensor device having a means for determining an on state and an off state, wherein said on state supplies said electrical current to said flat, electroluminescent sheet light source and in said off state said electrical current is not supplied to said flat, electroluminescent sheet light source.

17. The device of claim 16, wherein said means for determining said on state and said off state is based on a presence of light in said area.

18. The device of claim 16, wherein said means for determining said on state and said off state is based on an absence of light in said area.

19. The device of claim 16, wherein said means for determining said on state and said off state is based on a presence of motion in said area.

20. A solar cell powered flat night light which comprises:

a) a main body having a vertical upper portion, said vertical upper portion having a room facing side, a light receiving side and an edge, said light receiving side having adequate shape and dimension retaining a solar cell unit therein;

b) said main body having a horizontal middle section, said horizontal middle section having an upper side, a lower side and an edge; and c) said main body having a vertical lower portion, said vertical lower portion having a light illuminating side, an edge and a wall facing side, said light illuminating side having a shape and dimension housing a flat, electroluminescent sheet light source electrically connected to said solar cell unit, said light illuminating side having adequate configuration permitting illumination to be dispensed therefrom, and said horizontal middle section connected to said vertical upper and lower portions.

* * * * *